US011156538B2

(12) United States Patent
Martiska

(10) Patent No.: US 11,156,538 B2
(45) Date of Patent: Oct. 26, 2021

(54) RHEOMETER FOR MEASURING THE FLOW PROPERTIES OF POWDERS AND GRANULAR MATERIALS

(71) Applicant: Gregory Peter Martiska, Newtown, CT (US)

(72) Inventor: Gregory Peter Martiska, Newtown, CT (US)

(*) Notice: Subject to any disclaimer, the term of this patent is extended or adjusted under 35 U.S.C. 154(b) by 92 days.

(21) Appl. No.: 16/224,707

(22) Filed: Dec. 18, 2018

(65) Prior Publication Data

US 2020/0191692 A1    Jun. 18, 2020

(51) Int. Cl.
*G01N 11/14* (2006.01)
*G01N 3/24* (2006.01)

(52) U.S. Cl.
CPC .............. *G01N 11/14* (2013.01); *G01N 3/24* (2013.01); *G01N 2203/0284* (2013.01)

(58) Field of Classification Search
CPC .......... G01N 11/14; G01N 2011/0026; G01N 11/142; G01N 11/162; G01N 2011/0046; G01N 2033/0091; G01N 2203/0284; G01N 27/60; G01N 33/00; G01N 33/383; G01N 3/08; B01F 15/00201; B01F 15/00246; B01F 15/00376; B01F 2215/0047; B01F 7/00641; B01F 7/063; B01F 7/1695; B01F 7/247
USPC .... 73/54.23, 27–28, 35, 788, 818, 843, 846; 366/289, 309, 320
See application file for complete search history.

(56) References Cited

U.S. PATENT DOCUMENTS

| | | | |
|---|---|---|---|
| 3,939,701 A | | 2/1976 | Peschl |
| 4,380,399 A | * | 4/1983 | Godat ................... B01F 7/1695 366/289 |
| 4,535,621 A | * | 8/1985 | Gervais ................ G01N 11/162 73/54.23 |
| 6,065,330 A | * | 5/2000 | Freeman ................ G01N 11/14 73/54.28 |
| 6,167,752 B1 | * | 1/2001 | Raffer .................. G01N 11/142 73/54.28 |
| 8,438,914 B2 | * | 5/2013 | Martiska ................. G01N 3/08 73/84 |
| 8,499,619 B2 | | 8/2013 | Raffer |
| 10,031,057 B2 | * | 7/2018 | Romirer ................ G01N 11/14 |

(Continued)

OTHER PUBLICATIONS

David Am Ende, Melsissa Birch, Steven J, Brenek, Mark T. Maloney,Development and Application of Laboratory Tools to Predict Particle Properties upon Scale-Up in Agitated Filter-Dryers, Organic Process Research & Development 2013 17 (10), 1345-1358 DOI: 10.1021/op400080x, ACS Publications 1155 Sixteenth Street N.W. Washington, DC 20036.

*Primary Examiner* — Nimeshkumar D Patel
*Assistant Examiner* — Gedeon M Kidanu

(57) ABSTRACT

The invention relates to a rheometer comprising of a container for receiving a material sample to be investigated, a shaft with a rotating body which is immersed into the material sample, and a container lid that moves in the axial direction of the shaft into the sample container to deliver consolidating stress to the material sample. The forces acting on the material sample due to the rotation of the rotating body and the motion of the container lid and the location of the sample lid are measured as consolidating stress and rotational strain are applied and removed from the material sample.

1 Claim, 3 Drawing Sheets

(56) References Cited

U.S. PATENT DOCUMENTS

| | | | |
|---|---|---|---|
| 2005/0132782 A1* | 6/2005 | Wallevik | B01F 7/063 73/54.28 |
| 2015/0301003 A1* | 10/2015 | Martiska | G01N 33/00 73/866 |
| 2016/0266022 A1* | 9/2016 | Romirer | G01N 11/14 |
| 2017/0216817 A1* | 8/2017 | Torii | A61L 15/24 |

* cited by examiner

RHEOMETER FOR MEASURING THE FLOW PROPERTIES OF POWDERS AND GRANULAR MATERIALS

CROSS-REFERENCE TO RELATED APPLICATION

Not Applicable

BACKGROUND OF THE INVENTION

1) Field of the Invention

This invention relates to an apparatus for measuring the flow properties of bulk granular materials and powders and how they change under different stress and strain conditions. The information produced by these measurements can determine how well a material performs in various processes and equipment such as silos, industrial totes, pharmaceutical tableting machines, pneumatic conveyors, container filling machines, drying systems, and catalyst towers.

2) Description of the Related Art

Many apparatus and rheometers have been disclosed and produced that measure the flow properties of powders, granular materials, slurries, and liquids by applying rotational strain to sample materials and measuring various stresses. These systems range from powder rheometers to powder shear testers to liquid rheometers. The problem with these apparatus is that they cannot measure and control the consolidating or vertical stress and strain on the sample material while making the material flow under rotational strain. Either there is no provision for applying consolidating stress to the sample or the rotational device itself delivers the consolidating stress and cannot create flow in powders or granular materials without consolidating stress or after consolidating stress has been applied. Therefore these devices cannot measure the flow properties of powders and granular materials at different and known consolidating stresses ranging from no stress to high stress while materials are flowing under zero to high strain rates. These devices also cannot measure the volumetric stress or strain (dilation) produced by variable rotational strain rates or measure the memory effect of consolidating stress on powders or granular sample materials.

A rheometer with angled blades is disclosed in U.S. Pat. No. 6,065,330 for measuring powders. The angled blade is rotated and driven down and up in a column of powder. The energy required to drive the blade is measured and is related to the flow properties of the sample powder. The disadvantage of this technique is that the consolidating pressure on the sample powder is not known or controlled. The consolidating pressure changes with the height of the powder column, the friction between the blade and powder, and the rotation rate of the blades. In addition, the volumetric strain (dilation) produced in the sample by the rotation of the blade cannot be measured as there is no mechanism for measuring the volume of the powder during the analysis. Also the volumetric stress cannot be measured as there is no mechanism to measure the expansion force created in the sample material by the rotation strain.

A typical apparatus for measuring flow properties of granular material is a powder shear tester as produced by many manufacturers. An example of one such device is disclosed in U.S. Pat. No. 3,939,701. In these apparatus the sample material is loaded into a sample cell and force is applied to the cell lid while the cell or cell lid are rotated. The disadvantage of this technique is that both the consolidating stress and the rotational strain on the sample are delivered through the lid of the sample cell. Therefore it is not possible to test powder samples at high strain rates because the lid cannot deliver strain to most of the sample powder to make it flow. The strain is delivered only to a thin layer of the sample at a small distance below the lid. It is also not possible measure volumetric strain at zero vertical stress for the similar reasons. There must be some vertical stress to create rotational motion in the sample and there is no mechanism to apply rotational strain to most of a powder sample and measure the expansion created in the powder sample. In addition, it is not possible to measure the memory effect of consolidating stress on the sample because the sample lid will typically not create flow in the sample powder after stress is removed from the lid.

A typical rheometer for measuring flow properties of viscous samples consists of a shaft with blade, spindle, or cylinder attached that is immersed in the material sample. These blade, spindle, and cylinder devices have no provision for applying consolidating stress to the sample material. In addition, the volumetric strain produced in the sample by the rotation of the blade, spindle or cylinder cannot be measured.

Another rheometer for measuring flow properties of medium viscous samples consists of a rotating shaft with a plate attached. An example of one such device is disclosed in U.S. Pat. No. 8,499,619. The plate devices deliver consolidating stress to the sample material through the plate but the plate is also used to deliver rotational strain. Therefore it is not possible to test powder samples at high strain rates because the plate cannot deliver strain to most of the sample powder to make it flow. The strain is delivered only to a thin layer of the sample at a small distance below the plate. It is also not possible measure volumetric strain at zero vertical stress for the similar reasons. There must be some vertical stress to create rotational motion in the sample and there is no mechanism to apply rotational strain to most of a powder sample and measure the expansion created in the powder sample. In addition, it is not possible to measure the memory effect of consolidating stress on the sample because the plate will not create flow in the sample powder after the plate stress is reduced to zero.

Another rheometer for measuring powder properties is disclosed in U.S. Pat. No. 10,031,057. This device consists of a rheometer with a sample container with a sealed unmovable lid to allow measurement of the fluidization properties of powders. There is no provision for applying consolidating stress to the sample so this device can only measure the powder under no consolidating stress and fluidized conditions. In addition, the volumetric strain and volumetric stress produced in the sample by the rotation of the measuring body cannot be measured.

BRIEF SUMMARY OF THE INVENTION

After designing several powder flow testers including apparatus described in U.S. Pat. Nos. 8,438,914 and 8,335,343, the inventors of the present invention determined that industry and academia needed an apparatus to measure the flow properties of powders and granular materials over a wide range of consolidation pressures and flow speeds (strain rates). This would allow researchers to simulate powder flow behavior in most industrial conditions on one apparatus and in one test cell.

The invention consists of a rheometer with a rotating body with a sample container lid that is independent of the rotation of the rotating body and can deliver a known consolidation stress to the material sample being tested. The rotating body delivers rotational strain to the sample while the sample container lid delivers known consolidating stress. In this way the rotating body can deliver strain to the interior of the powder sample with or without consolidating stress. In addition, the rotating body can be configured of different shapes to create different types of motion in the material sample.

The forces on the material sample created by the rotating body and by the sample container lid are measured for various consolidation stresses and strain rates. This allows the rheometer to measure flow properties of the material sample at zero to high consolidating pressures and at zero to high strain rates. In addition, the volumetric strain (dilation) of the material sample due to rotational strain can be determined by measuring the location of the container lid when the stress on the lid is at zero pressure. Also the volumetric stress of the material sample due to flow can be determined by fixing the location of the sample container lid and measuring the stress on the sample container lid as the rotational strain is increased and decreased.

DETAILED DESCRIPTION OF THE INVENTION

Figure 1:
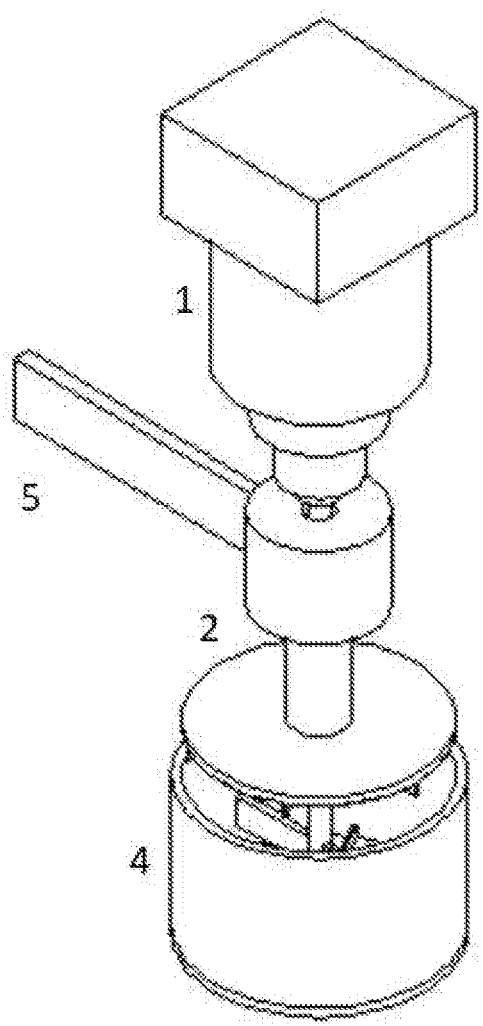
FIG. 1 presents an isometric drawing of the preferred embodiment of the rheometer.
Figure 2:
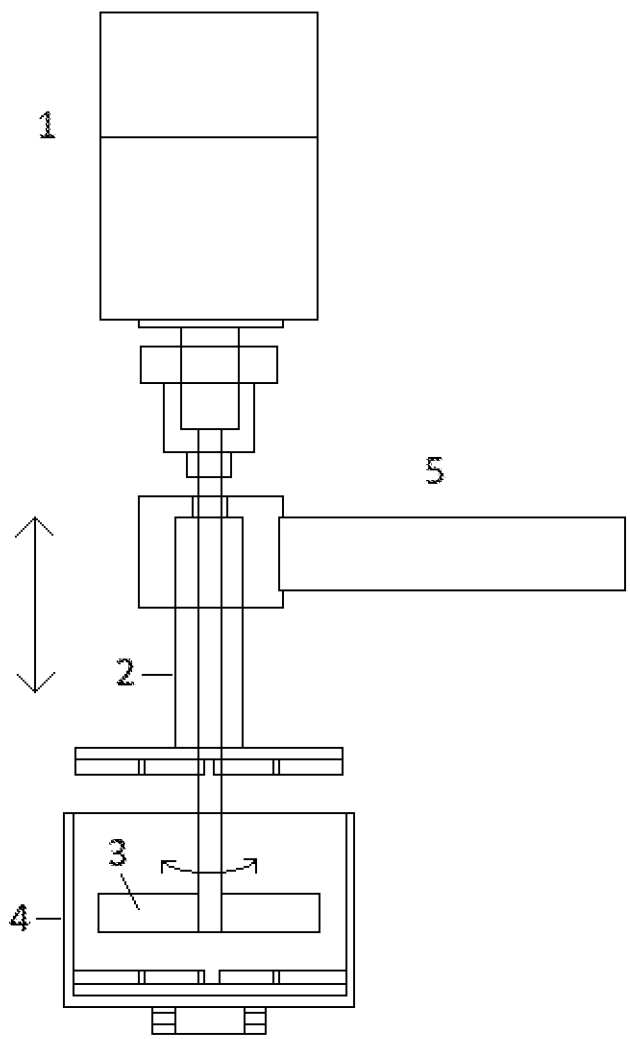
FIG. 2 presents a drawing of the preferred embodiment of the rheometer.
Figure 3:
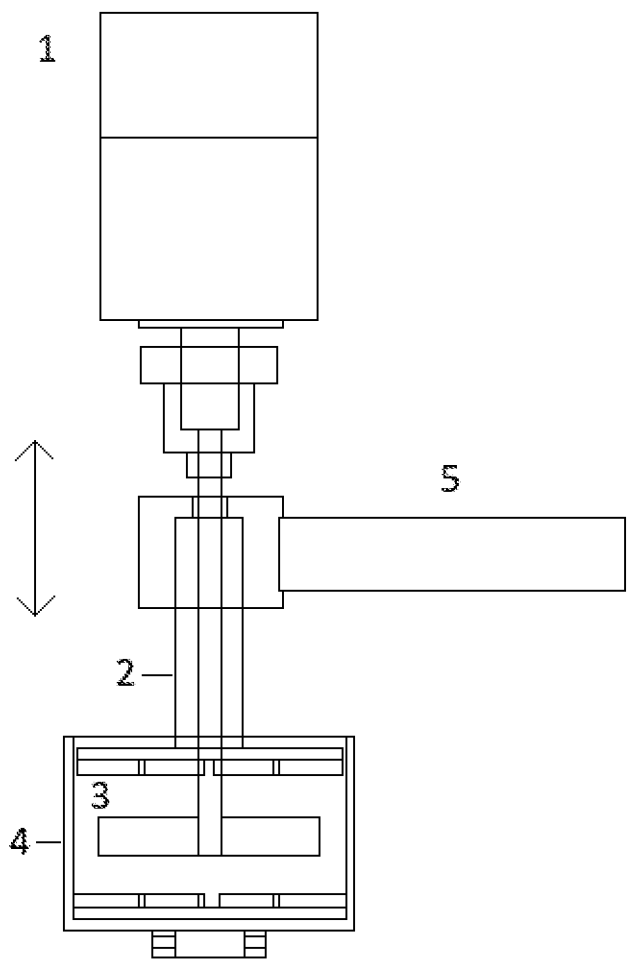
FIG. 3 presents a drawing of the preferred embodiment of the rheometer with the sample container lid in the measurement position.

The preferred embodiment of the invention is shown in FIG. 1, FIG. 2, and FIG. 3. The rheometer consists of a shaft drive unit 1, a shaft with a rotating body attached 3, a container lid 2 that is movable in the direction of the axis of the shaft 3, a sample material container 4, and a lid drive 5. The sample container 4 is partially filled with the material sample so the rotating body is immersed in the material sample when under consolidating stress. The container lid has dimensions so that it can move inside the sample container.

At the start of an analysis the container lid 2 moves down to make contact with the material sample as in FIG. 3. The shaft and rotating body are then rotated to apply rotational strain to the sample. Depending on the analysis procedure, the vertical stress is increased or decreased by moving the container lid 2 down or up. In coordination with the container lid movement the shaft rotation speed can be increased, decreased, or stopped. During the analysis, a measuring unit is used to measure the forces acting on the material sample due to the rotation of the shaft and rotating body 3, the forces acting on the material sample due to the motion of the container lid 2, and the location of the container lid 2.

Various analysis procedures can be used to simulate powder flowing through different industrial powder handling machines and storage units. These procedures include flowing the material sample then stopping the flow and applying a know consolidating stress to the material. Then the rotation of the measuring body is started again to determine the stress required to initiate flow in the material sample and if the sample flow is altered by exposure to stress. Another procedure would vary the consolidating stress on the sample material while the rotational strain is held at a known and fixed rate. Another procedure would hold the sample container lid at a fixed location and measure the change in stress on the sample container lid as the rotational speed is increased and decreased to determine the volumetric stress created by the rotational strain. The analysis procedures can be changed to alter the stress and strain paths on the samples to match specific industrial powder flow conditions.

The drive units for the shaft and rotating body and sample container lid are shown only schematically but are known to persons skilled in the art. The measuring unit to measure the forces acting on the material sample due to the rotation of the rotating body and movement of the container lid and the location of the sample lid are not shown but are known to persons skilled in the art.

What is claimed is:

1. A rheometer for assessing characteristics of powders and granular materials, the rheometer comprising:
    a) a sample container for receiving a material sample to be investigated;
    b) a measuring shaft with a measuring rotating body, wherein said measuring rotating body and said sample container are rotatable relative to one another and said measuring rotating body is immersed into the material sample, wherein the measuring shaft and the measuring rotating body are rotated by a single drive unit;
    c) a container lid that fits inside said sample container without contacting said sample container and is in contact with the material sample, wherein the container lid comprises a passage to allow said measuring shaft to pass through and the container lid is prevented from rotating with said measuring shaft;
    d) a drive mechanism to cause a linear motion between the container lid and the sample container to apply stress and strain to the material sample; and
    e) a measuring unit outside of said sample container configured to evaluate measured values received from said measuring rotating body and the stress and strain applied to the material sample by the linear motion between the sample container and sample lid.

\* \* \* \* \*